(12) United States Patent
Xia et al.

(10) Patent No.: US 10,582,581 B2
(45) Date of Patent: Mar. 3, 2020

(54) LIGHTING DEVICE AND CONTROL METHOD THEREOF

(71) Applicant: SHENZHEN ROYALE TECHNOLOGIES CO., LTD., Guangdong (CN)

(72) Inventors: Xinyuan Xia, Guangdong (CN); Xuan Zhang, Guangdong (CN); Songling Yang, Guangdong (CN)

(73) Assignee: SHENZHEN ROYOLE TECHNOLGIES CO., LTD., Shenzhen (CN)

( * ) Notice: Subject to any disclaimer, the term of this patent is extended or adjusted under 35 U.S.C. 154(b) by 0 days.

(21) Appl. No.: 16/068,620

(22) PCT Filed: Apr. 15, 2016

(86) PCT No.: PCT/CN2016/079502
§ 371 (c)(1),
(2) Date: Jul. 6, 2018

(87) PCT Pub. No.: WO2017/177461
PCT Pub. Date: Oct. 19, 2017

(65) Prior Publication Data
US 2019/0029087 A1   Jan. 24, 2019

(51) Int. Cl.
*H05B 33/08* (2020.01)
*G04G 9/04* (2006.01)
(Continued)

(52) U.S. Cl.
CPC ..... *H05B 33/0842* (2013.01); *F21V 23/0485* (2013.01); *G04G 9/04* (2013.01);
(Continued)

(58) Field of Classification Search
CPC . H05B 33/0842; H05B 33/0863; G06F 3/041; G06F 1/1652; G06F 3/03547;
(Continued)

(56) References Cited

U.S. PATENT DOCUMENTS

2006/0262654 A1* 11/2006 Su ............................ G04G 9/04
368/223
2009/0153517 A1*  6/2009 Liu ...................... G06F 3/03547
345/173
(Continued)

FOREIGN PATENT DOCUMENTS

CN         1598718 A   *   3/2005
CN         1598718 A       3/2005
(Continued)

OTHER PUBLICATIONS

International Search Report for PCT/CN2016/079502 dated Jan. 4, 2017.

*Primary Examiner* — Renan Luque
(74) *Attorney, Agent, or Firm* — IPro, PLLC; Na Xu

(57) ABSTRACT

A lighting device and a method for controlling the same are provided. The lighting device includes a base; a light source mounted on the base; a touch sensitive element electrically connected with the light source: and a controller electrically connected with the light source and configured to control the light source to lighten at a position corresponding to a touching position sensed by the touch sensitive element.

20 Claims, 4 Drawing Sheets

(51) Int. Cl.
*F21V 23/04* (2006.01)
*F21Y 103/33* (2016.01)
*F21S 8/04* (2006.01)
*F21Y 115/10* (2016.01)
*F21V 7/00* (2006.01)
*G06F 3/0488* (2013.01)
*G06F 1/16* (2006.01)
*G06F 3/0354* (2013.01)
*G06F 3/041* (2006.01)
*F21S 6/00* (2006.01)

(52) U.S. Cl.
CPC ........ *G06F 1/1652* (2013.01); *G06F 3/03547* (2013.01); *G06F 3/041* (2013.01); *G06F 3/04883* (2013.01); *G06F 3/04886* (2013.01); *H05B 33/0863* (2013.01); *F21S 6/00* (2013.01); *F21S 8/04* (2013.01); *F21V 7/0016* (2013.01); *F21Y 2103/33* (2016.08); *F21Y 2115/10* (2016.08)

(58) Field of Classification Search
CPC .... G06F 3/04886; G06F 3/04883; F21S 4/28; G04G 9/04
See application file for complete search history.

(56) References Cited

U.S. PATENT DOCUMENTS

| | | | | |
|---|---|---|---|---|
| 2012/0161667 | A1* | 6/2012 | Mason | F21V 23/0442 315/297 |
| 2012/0248992 | A1* | 10/2012 | Jeon | H05B 37/0227 315/155 |
| 2012/2248992 | | 10/2012 | Jeon Jong Hoon | |
| 2012/0320627 | A1* | 12/2012 | Araki | F21S 8/04 362/608 |
| 2013/0107536 | A1* | 5/2013 | Hiraoka | F21S 8/04 362/277 |
| 2013/0113397 | A1* | 5/2013 | Salter | F21V 23/04 315/362 |
| 2013/0208468 | A1* | 8/2013 | Chen | F21V 7/0058 362/235 |
| 2013/0258644 | A1* | 10/2013 | Comunale | A41D 19/0157 362/103 |
| 2013/0301293 | A1* | 11/2013 | Hiraoka | F21S 8/04 362/576 |
| 2014/0197757 | A1* | 7/2014 | Heinrich | H05B 37/0227 315/294 |
| 2014/0265934 | A1* | 9/2014 | Ramey | B60Q 3/54 315/307 |
| 2015/0130752 | A1* | 5/2015 | Sumi | H03K 17/9622 345/174 |
| 2015/0305126 | A1* | 10/2015 | Maeda | H05B 37/0281 315/134 |

FOREIGN PATENT DOCUMENTS

| | | |
|---|---|---|
| CN | 101458584 A | 6/2009 |
| CN | 202631985 U | 12/2012 |
| CN | 202854505 U | 4/2013 |
| CN | 103562625 A | 2/2014 |
| CN | 203453988 U | 2/2014 |
| CN | 105007650 A | 10/2015 |
| EP | 2506686 A | 10/2012 |
| EP | 2439445 A | 11/2012 |
| EP | 2594846 A | 12/2013 |
| JP | 2005504411 A | 2/2005 |
| JP | 2013503428 A | 1/2013 |
| JP | 2013104752 A | 5/2013 |
| JP | 2014082221 A | 5/2014 |
| JP | 2014186931 A | 10/2014 |
| JP | 2013088285 A | 5/2015 |
| JP | 2015146321 A | 8/2015 |
| WO | 2011024111 A | 3/2011 |
| WO | 2014178713 A | 11/2014 |
| WO | WO-2014178713 A1 * | 11/2014 ........... G06F 3/0482 |

\* cited by examiner

LIGHTING DEVICE AND CONTROL METHOD THEREOF

This application is a National Phase Application under 35 USC 371 of International Application No. PCT/CN2016/079502, filed Apr. 15, 2016, the entire contents of which are incorporated herein by reference.

FIELD

The present disclosure relates to a lighting device and a method for controlling the same, and more particularly to a lamp and a method for controlling the same.

BACKGROUND

Brightness of an existing lamp usually is controlled integrally by a switch, that is, the lamp as a whole will be turned on or off when the switch is operated. Therefore, the light of the lamp cannot be partially controlled, which is not flexible in use, and limits its applications.

SUMMARY

Embodiments of the present disclosure provide a lighting device and a method for controlling the same which can be used flexibly.

In embodiments of the present disclosure, a lighting device is provided. The lighting device includes a base; a light source mounted on the base; a touch sensitive element electrically connected with the light source; and a controller electrically connected with the light source and configured to control the light source to lighten at a position corresponding to a touching position sensed by the touch sensitive element.

In embodiments of the present disclosure, a method for controlling a lighting device is provided. The method includes: sensing a touching position by a touch sensitive element of the lighting device; and controlling a light source of the lighting device to lighten at a position corresponding to the touching position.

BRIEF DESCRIPTION OF THE DRAWINGS

Drawings which will be involved in the description of embodiments will be introduced below in brief for illustrating technical solutions in embodiments of the present disclosure more clearly, it will be appreciated that drawings described below are just some implementations of the present disclosure, and other modifications can also be obtained by those who skilled in the art, without creative work.

DETAILED DESCRIPTION

Figure 1:
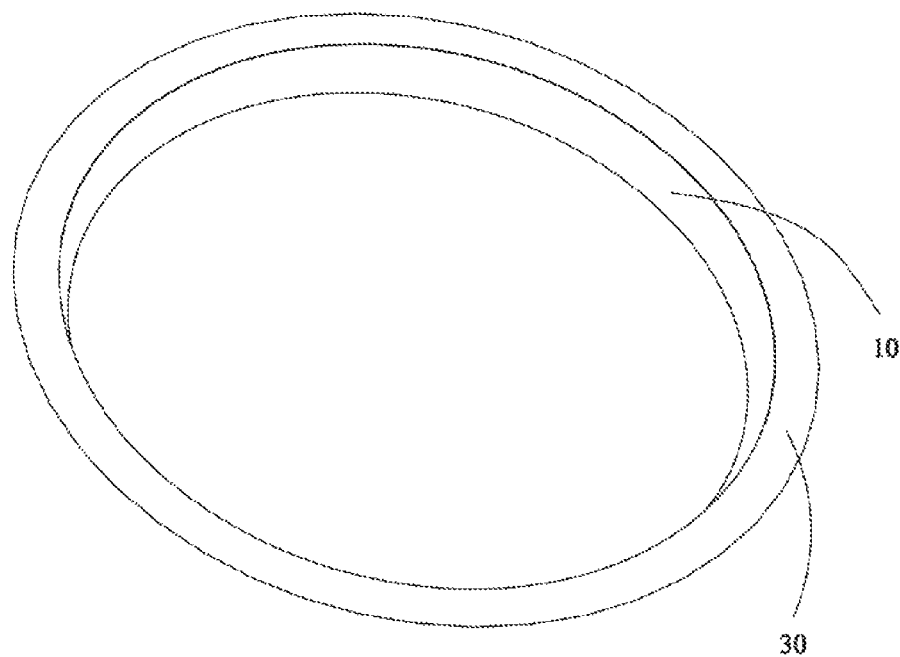
FIG. 1 is a schematic perspective view of a lighting device according to an embodiment of the present disclosure.

In the following, embodiments of the present disclosure will be described clearly with reference to drawings.

Embodiments of the present disclosure provide a lighting device and a method for controlling the same which can be used flexibly.

In embodiments of the present disclosure, a lighting device is provided. The lighting device includes a base; a light source mounted on the base; a touch sensitive element electrically connected with the light source: and a controller electrically connected with the light source and configured to control the light source to lighten at a position corresponding to a touching position sensed by the touch sensitive element.

In embodiments of the present disclosure, a shape of the light source corresponds to a shape of the touch sensitive element.

In embodiments of the present disclosure, the light source and the touch sensitive element are annular.

In embodiments of the present disclosure, a light emitting surface of the light source is inclined relative to a touch surface of the touch sensitive element.

In embodiments of the present disclosure, the base includes a side wall and a supporting wall connected with the side wall, the light source surrounds the side wall, and the touch sensitive element is on the supporting wall.

In embodiments of the present disclosure, the supporting wall surrounds the side wall and is fixed on the side wall.

In embodiments of the present disclosure, light emitted by the light source is transmitted through the supporting wall and the touch sensitive element after reflected.

In embodiments of the present disclosure, the side wall has a hollow structure, and the controller is accommodated in the side wall.

In embodiments of the present disclosure, the supporting wall includes an arc-shaped supporting surface, and the touch sensitive element includes a flexible touch panel attached to the arc-shaped supporting surface.

In embodiments of the present disclosure, the controller is configured to control the light source to turn on or off according to a touching direction sensed by the touch sensitive element.

In embodiments of the present disclosure, a method for controlling a lighting device is provided. The method includes: sensing a touching position by a touch sensitive element of the lighting device; and controlling a light source of the lighting device to lighten at a position corresponding to the touching position.

In embodiments of the present disclosure, sensing a touching position by a touch sensitive element of the lighting device includes: sensing a touching trajectory by the touch sensitive element of the lighting device; and controlling a light source of the lighting device to lighten at a position corresponding to the touching position includes: controlling the light source of the lighting device to form a lighting trajectory corresponding to the touching trajectory.

In embodiments of the present disclosure, the method further includes: sensing a reversed touching trajectory by the touch sensitive element of the lighting device: and controlling the light source of the lighting device to form an extinguishing trajectory corresponding to the reversed touching trajectory.

In embodiments of the present disclosure, the method further includes: sensing a touching gesture by the touch sensitive element of the lighting device; and controlling brightness of the light source of the lighting device to vary.

In embodiments of the present disclosure, the touching gesture includes a double-click gesture on the touch sensitive element.

In embodiments of the present disclosure, the method further includes: controlling the light source to emit a first light at a first position for simulating an hour hand, and a second light at a second position for simulating a minute hand according to a current time, in which the first light differs from the second light.

In embodiments of the present disclosure, the first light differs from the second light in light intensity.

In embodiments of the present disclosure, the lighting device includes a side wall and a supporting wall connected with the side wall, the light source surrounds the side wall, and the touch sensitive element is attached to the supporting wall.

In embodiments of the present disclosure, a light emitted by the light source is transmitted through the supporting wall and the touch sensitive element after reflected.

In embodiments of the present disclosure, the side wall has a hollow annular structure, and the lighting device includes a controller accommodated in the side wall.

The lighting device can be controlled to lighten partially by sensing the touching position by the touch sensitive element and controlling the light source to lighten at a position corresponding to the touching position, which enables users to adjust the lighting position of the lighting device according to their requirements and makes the use of the lighting device more flexibly.

Figure 2:
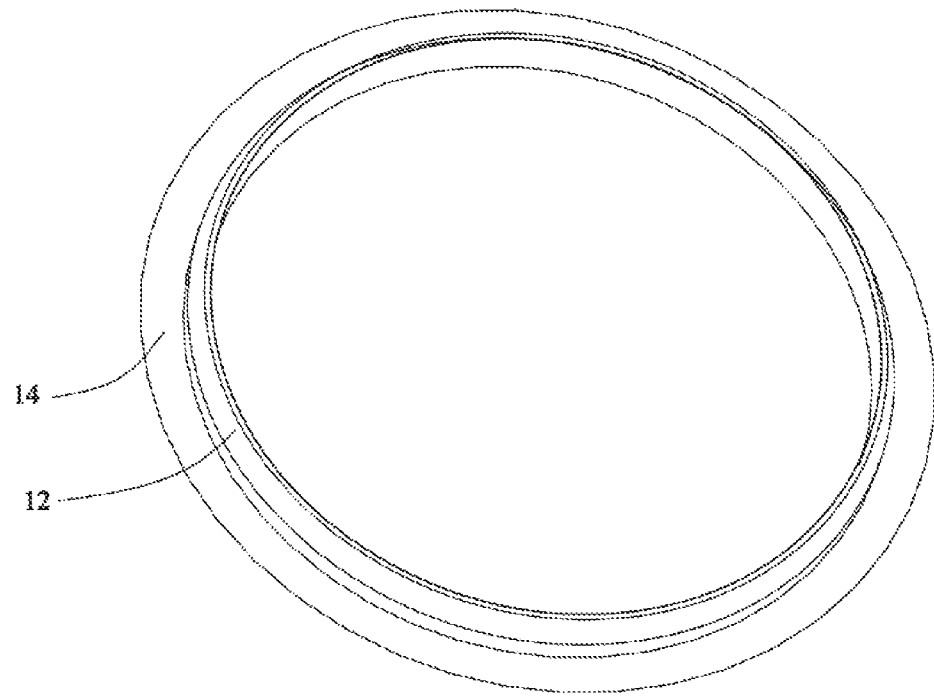
FIG. 2 is an inverted view of the lighting device shown in FIG. 1, where a light source is removed.
Figure 3:
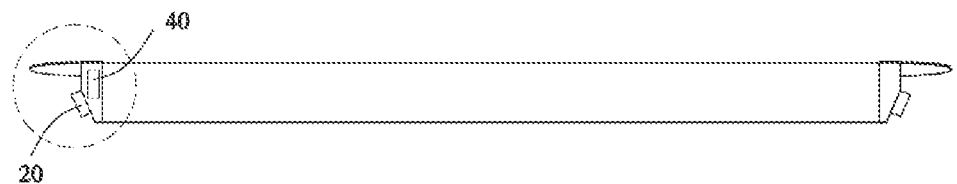
FIG. 3 is a sectional view of the lighting device shown in FIG. 1.

Referring to FIGS. 1-3, which show a lighting device according to an embodiment of the present disclosure, in this embodiment, the lighting device is a wall lamp which may be mounted on a wall. The lighting device includes a base 10, a light source 20 mounted on the base 10, a touch sensitive element 30 and a controller 40.

Figure 4:
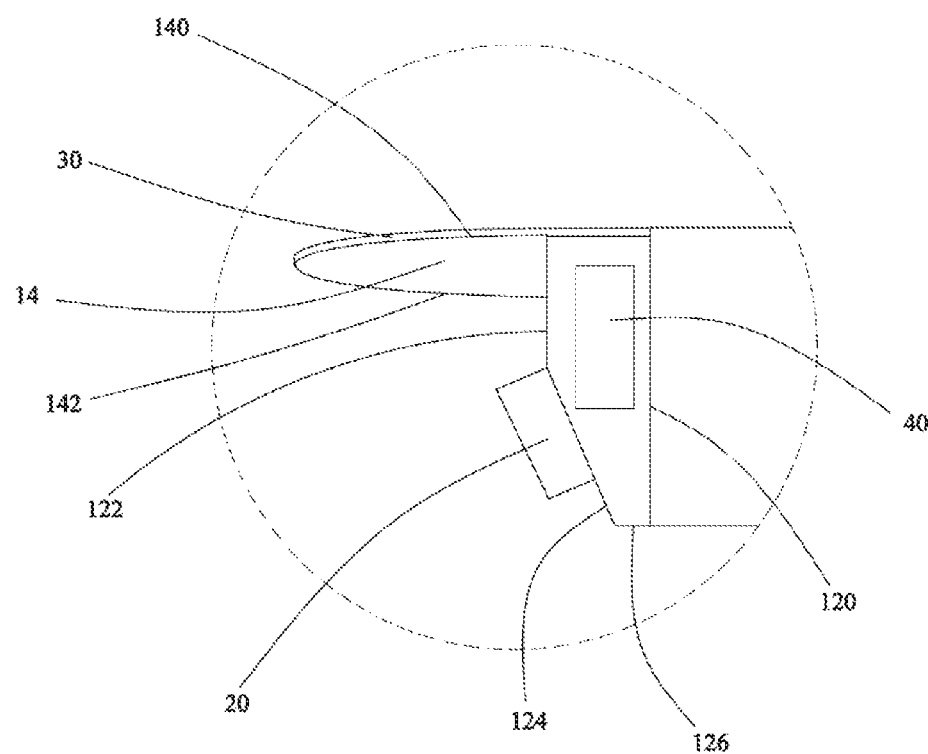
FIG. 4 is an enlarged view of part 111 of the lighting device shown in FIG. 3.
Figure 5:
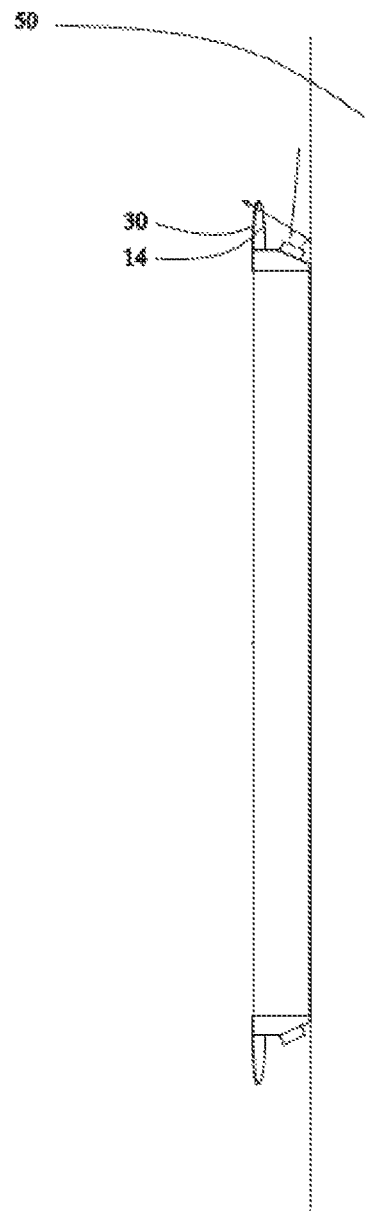
FIG. 5 is a schematic diagram of the lighting device shown in FIG. 1 in a usage state.

Further referring to FIG. 4, the base 10 includes a side wall 12 and a supporting wall 14 connected with the side wall 12. The side wall 12 is made of a metal or a plastic, and the supporting wall 14 is made of a transparent material, such as acrylic, glass and the like. The side wall 12 has a hollow structure and is provided with the controller 40 and a power supply therein. The side wall 12 as a whole is annular, an inner surface of the side wall 12 is an inner annular surface 120, and an outer surface of the side wall 12 includes an outer annular surface 122 parallel to the inner surface 120 and an inclined mounting surface 124. A width of the outer annular surface 122 is smaller than that of the inner annular surface 120. The mounting surface 124 is inclined relative to the outer annular surface 122, and a radius of the mounting surface 124 gradually decreases in a direction away from the supporting wall 14. The side wall 12 further includes an adjoining surface 126 between the inner surface and the outer surface. The adjoining surface 126 is configured to attach to a supporter 50, such as a wall, as shown in FIG. 5, so as to fix the lighting device. The adjoining surface 126 connects the mounting surface 124 and the inner annular surface 120, and is perpendicular to the inner annular surface 120 and inclined relative to the mounting surface 124. As the inner annular surface 120 is annular, a hollow structure is formed for the base 10, and the supporter 50 is exposed to a space surrounded by the inner annular surface 120 when the base is fixed on the supporter 50. Accordingly, an area of the supporter 50 occupied by the lighting device is smaller, thereby saving space effectively.

Further referring to FIG. 5, the light source 20 is mounted on the mounting surface 124 of the base 10. In an embodiment, the light source 20 is a circular annular light band surrounding the mounting surface 124 and including a plurality of individually controlled LEDs. All the LEDs are electrically connected with the controller 40 so as to be controlled by the controller 40 to turn on or off individually. As the mounting surface 124 is inclined, a light emitting surface of the LED is inclined relative to the outer annular surface 122 towards the supporter 50, so as to emit light outwards. Light emitted by the LEDs reaches the supporter 50 slantwise, thereby expanding the illumination range and ensuring the illumination brightness. Part of the light illuminates the supporter 50 directly and another part of the lights is transmitted through the supporting wall 14 and the touch sensitive element 30 after reflected by the supporter 50.

The supporting wall 14 is of a circular annular shape, and is perpendicular to the side wall 12. The supporting wall 14 surrounds and is fixed on the outer annular surface 122 of the side wall 12. The supporting wall 14 includes a supporting surface 140 and a back surface 142 connected with the supporting surface 140, both of which are annular. The supporting surface 140 bends gradually towards the back surface 142 from inside to outside to form an arc surface, and the back surface 142 bends gradually towards the supporting surface 140 from inside to outside to form an arc surface.

The touch sensitive element 30 is mounted on the supporting wall 14 of the base 10. In an embodiment, the touch sensitive element 30 is a flexible touch panel which can be closely attached to the arc-shaped supporting surface 140. A thickness of the touch sensitive element 30 is smaller than that of the supporting wall 14. The touch sensitive element 30 also is of a circular annular shape, part of which is jointed with the supporting surface 140, and another part of which is joined to an annular surface of the side wall 12. Certainly, the touch sensitive element 30 also may be only on the supporting surface 140 or on the annular surface of the side wall 12. A touch surface of the touch sensitive element 30 is inclined relative to the light emitting surface of the light source 20. The shape of the touch sensitive element 30 corresponds to the shape of the light source 20. In an embodiment, the touch sensitive element 30 has a same or similar circular annular shape as the light source 20. Certainly, in other alternative embodiments, the shape of the touch sensitive element 30 may be different from that of the light source 20, as long as there is a corresponding relationship between the shape of the touch sensitive element 30 and the shape of the light source 20. For example, the touch sensitive element 30 is of a square annular shape, and the light source 20 is of a circular annular shape; or the touch sensitive element 30 is of a circular annular shape, and the light source 20 is of a triangular annular shape; or the touch sensitive element 30 is of a circular shape, and the light source 20 is of a rectangular shape; or the touch sensitive element 30 is of a crescent shape, and the light source 20 is of a U shape, and the like. Further, "there is a corresponding relationship between the shape of the touch sensitive element 30 and the shape of the light source 20" as described above indicates that contours of the two shapes have a consistent or similar degrees of closure, for example, the triangular shape and circular shape have a completely closed contour, while the crescent shape and the U shape have an unclosed contour and a similar degree of closure. Further, the present disclosure may also include such a case that there is no corresponding relation between the shape of the touch sensitive element 30 and the shape of the light source 20, as long as there is a corresponding relationship between the touching position and the lighting position.

The touch sensitive element 30 may sense the touching position of a user and output a touching signal to the controller 40, and the controller 40 controls the light source 20 to lighten at a position corresponding to the touching position according to a controlling signal. In an embodiment, the touching position is consistent with the lighting position, i.e., when a certain position of the touch sensitive element 30 is touched by the user, the LED right below the position lights up. Of course, the touching position may also be inconsistent with the lighting position, as long as there is a corresponding relationship between the touching position and the lighting position, for example, the lighting position may be near the touching position or even away from the touching lighting position. Herein, "there is a corresponding relationship between the touching position and the lighting position" means that the same one lighting position cannot corresponds to two or more touching positions at the same time, that is, it cannot lighten the same one lighting position by touching at different touching positions.

Figure 6:
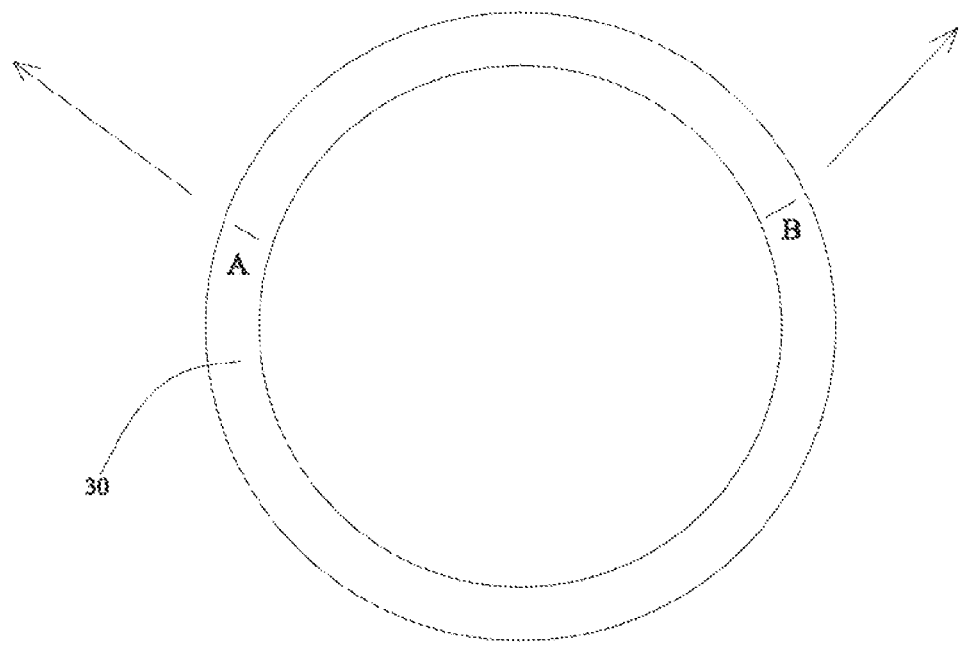
FIG. 6 is a schematic diagram of the lighting device shown in FIG. 5 in another angle of view.

Further, the touch sensitive element 30 can also sense a touching trajectory of the user and output a touching signal to the controller 40, and the controller 40 controls the light source 20 to form a lighting trajectory corresponding to the touching trajectory according to the touching signal. In an embodiment, the touching trajectory is consistent with the lighting trajectory. For example, as shown in FIG. 6, when the user touches the touch sensitive element 30 from position A to position B to form an arc touching trajectory, LEDs right below the touching trajectory emit light to form an arc lighting trajectory. Of course, the touching trajectory may also be inconsistent with the lighting trajectory, as long as there is a corresponding relationship between the touching trajectory and the lighting trajectory. For example, the lighting trajectory may be formed near the touching trajectory or even away from the touching trajectory. It will be appreciated that, a length of the lighting trajectory should be in a certain proportional relation with a length of the touching trajectory, including but not limited to 100%, 50%, 200%, 80% and the like. Furthermore, if the touch sensitive element 30 senses a reversed touching trajectory, the controller 40 controls the LEDs corresponding to the touching trajectory to turn off so as to form an extinguishing trajectory. That is, the controller 40 controls the light source 20 to turn on or off according to different touching directions sensed by the touch sensitive element 30.

Further, the touch sensitive element 30 may also sense a touching gesture of the user and output a touching signal to the controller 40, and the controller 40 controls brightness of the light source 20 according to the touching signal. For example, the brightness of the light source 20 increases or decreases according to a double-click gesture on any position of the touch sensitive element 30.

Figure 7:
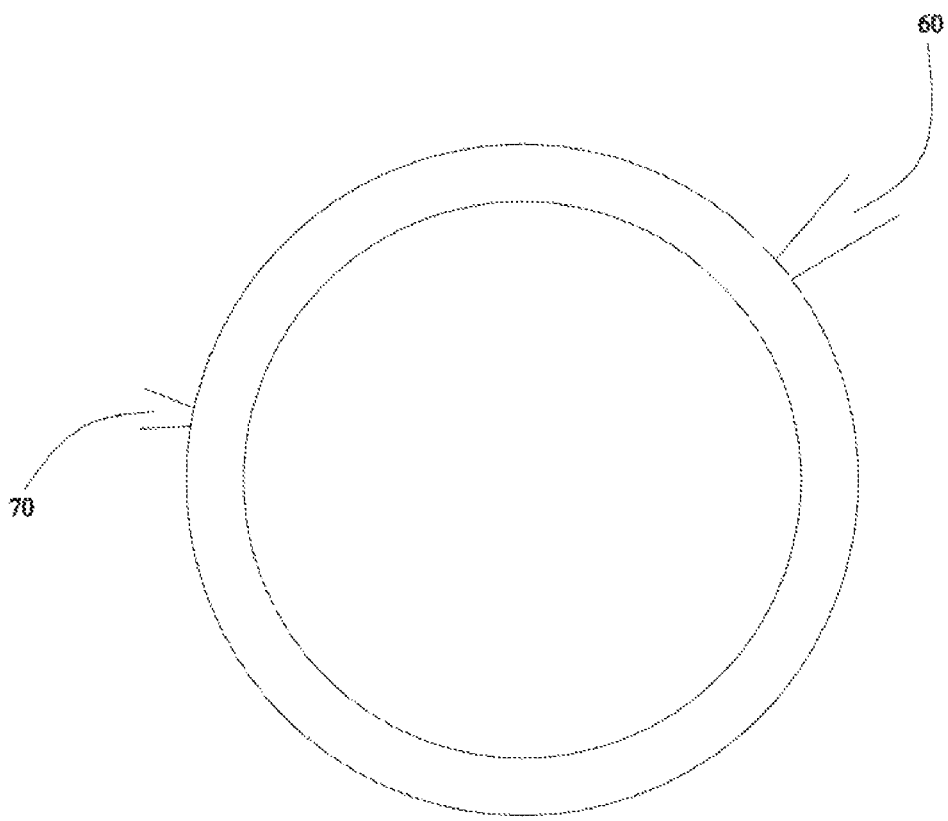
FIG. 7 is a schematic diagram of the lighting device shown in FIG. 1 in another usage state.

Further, the controller 40 can also selectively control the light source 20 to lighten at a corresponding position so as to achieve an effect like a clock. As shown in FIG. 7, the controller 40 controls a first LED corresponding to a position of an hour hand to emit a first light 60 to simulate the hour hand, and a second LED corresponding to a position of a minute hand to emit a second light 70 to simulate the minute hand, according to a current time. In an embodiment, the brightness of the first light is greater than that of the second light. When the hour hand and the minute hand coincide, only the LED at this coincident position is controlled to lighten. Further, in order to simultaneously achieve the simulations of the hour hand and the minute hand when the hour hand and the minute hand coincide, two layers of LEDs can be provided, with one layer of LEDs to simulate the hour hand separately and the other layer of LEDs to simulate the minute hand separately. Additionally, in order to distinguish the hour hand and the minute hand more clearly, different colors can be used. For example, the first LED radiates in a first color, the second LED radiates in a second color, and the first color is different from the second color. Further, as the touch sensitive element 30 also is circular, the time can be adjusted by sliding on the touch sensitive element 30. Specifically, when the first LED radiates to indicate the hour hand, if the user touches the touch sensitive element 30 at a position corresponding to the lighting position and then slides clockwise or counterclockwise on the touch sensitive element 30, the controller 40 controls, according to touching signals, the first LED to turn off and a LED at a position corresponding to the slide terminating position to turn on.

Embodiments of the present disclosure further provide a method for controlling a lighting device, including: sensing a touching position on a touch sensitive element 30 of the lighting device; and controlling a light source 20 of the lighting device to lighten at a position corresponding to the touching position.

The corresponding LED can be precisely controlled to lighten by a touch on the touch sensitive element 30, so as to achieve a partial lighting effect. As a consequence, users can adjust the lighting direction of the lighting device to adapt the lighting device to different occasions according to their requirements. Moreover, as the lighting direction is controlled by a touching manner, the operation is more simple and convenient. In addition, as the touching position is consistent with the lighting position, the user can intuitively control the lighting direction, so as to use the lighting device more flexibly.

It will be appreciated that, the above embodiments are illustrated by taking the wall lamp as an example, other types of lighting devices, such as a table lamp, a floor lamp, a ceiling lamp, an atmosphere lamp and a projection lamp and so on, are also applicable to the present disclosure. For example, if the lighting device is a table lamp, LEDs of the table lamp may be annularly arranged around its lamp-post, and an annular touch sensitive element may be disposed on a top surface of a lampshade covering the LEDs, in such a case, the user may touch different positions of the touch sensitive element to turn on or off the LED at a corresponding position. For another example, the lighting device includes a ceiling lamp and a separate control switch, the ceiling lamp may include LEDs annularly arranged, the control switch is on the wall and includes an annular touch sensitive element, in such a case, the user also can touch different positions of the touch sensitive element to turn on or off the LED at a corresponding position. For yet another example, the lighting device includes an atmosphere lamp in a car and a control panel of a console, the atmosphere lamp may include LEDs arranged in a straight line, the control panel includes a linear touch sensitive element, in such a case, the user may touch different positions of the touch sensitive element to turn on or off a corresponding LED.

It will be appreciated that, the light source 20 may also be annularly mounted on the back surface 142 of the supporting wall 14, and the touch sensitive element 30 is annularly mounted on the mounting surface 124 of the side wall 12, and in such a case, the effect described above can also be achieved.

What is claimed is:
1. A lighting device, comprising
a base mounted on a wall;
a light source mounted on the base;
a touch sensitive element electrically connected with the light source; and a controller electrically connected with the light source and configured to control the light source to lighten at a position corresponding to a touching position sensed by the touch sensitive element, wherein a part of the light emitted by the light source directly illuminates the wall outside the lighting device without being refracted or reflected in a light path from the light source to the wall, and another part of the light is transmitted through the touch sensitive element after reflected by the wall;

and the light source is directly exposed to the wall outside the lighting device along a light emitting direction thereof.

2. The lighting device according to claim 1, wherein a shape of the light source corresponds to a shape of the touch sensitive element.

3. The lighting device according to claim 2, wherein the light source and the touch sensitive element are both annular.

4. The lighting device according to claim 1, wherein a light emitting surface of the light source is inclined relative to a touch surface of the touch sensitive element.

5. The lighting device according to claim 1, wherein the base comprises a side wall and a supporting wall connected with the side wall, the light source surrounds the side wall, and the touch sensitive element is on the supporting wall.

6. The lighting device according to claim 5, wherein the supporting wall surrounds the side wall and is fixed on the side wall.

7. The lighting device according to claim 5, wherein a light emitted by the light source is transmitted through the supporting wall and the touch sensitive element after reflected.

8. The lighting device according to claim 5, wherein the side wall has a hollow structure, and the controller is accommodated in the side wall.

9. The lighting device according to claim 5, wherein the supporting wall comprises an arc-shaped supporting surface, and the touch sensitive element comprises a flexible touch panel attached to the arc-shaped supporting surface.

10. The lighting device according to claim 1, wherein the controller is configured to control the light source to turn on or off according to a touching direction sensed by the touch sensitive element.

11. A method for controlling a lighting device, comprising:

sensing a touching position by a touch sensitive element of the lighting device; and controlling a light source of the lighting device to lighten at a position corresponding to the touching position, wherein the lighting device is mounted on a wall, a part of the light emitted by the light source directly illuminates the wall outside the lighting device without being refracted or reflected in a light path from the light source to the wall and another part of the light is transmitted through the touch sensitive element after reflected by the wall;

and the light source is directly exposed to the wall outside of the lighting device along a light emitting direction thereof.

12. The method according to claim 11, wherein sensing a touching position by a touch sensitive element of the lighting device, comprises: sensing a touching trajectory by the touch sensitive element of the lighting device; and controlling a light source of the lighting device to lighten at a position corresponding to the touching position, comprises: controlling the light source of the lighting device to form a lighting trajectory corresponding to the touching trajectory.

13. The method according to claim 12, further comprising:

sensing a reversed touching trajectory by the touch sensitive element of the lighting device; and controlling the light source of the lighting device to form an extinguishing trajectory corresponding to the reversed touching trajectory.

14. The method according to claim 11, further comprising:

sensing a touching gesture by the touch sensitive element of the lighting device; and controlling a brightness of the light source of the lighting device to vary.

15. The method according to claim 14, wherein the touching gesture comprises a double-click gesture on the touch sensitive element.

16. The method according to claim 11, further comprising:

controlling the light source to emit a first light at a first position for simulating an hour hand and a second light at a second position for simulating a minute hand according to a current time, wherein the first light differs from the second light.

17. The method according to claim 16, wherein the first light differs from the second light in light intensity.

18. The method according to claim 11, wherein the lighting device comprises a side wall and a supporting wall connected with the side wall, the light source surrounds the side wall, and the touch sensitive element is attached to the supporting wall.

19. The lighting device according to claim 5, wherein the supporting wall has a diameter gradually decreasing towards the wall.

20. The lighting device according to claim 1, wherein the base comprises a side wall and a supporting wall connected with the side wall, the touch sensitive element surrounds the side wall, and the light source is on the back of the supporting wall.

* * * * *